United States Patent [19]

D'Alessandro, Sr.

[11] Patent Number: 5,787,590
[45] Date of Patent: Aug. 4, 1998

[54] EXTENSION AND SUPPORT FOR ELECTRIC CLIPPERS

[76] Inventor: Thomas C. D'Alessandro, Sr., 4300 Miller Ave., West Palm Beach, Fla. 33405

[21] Appl. No.: 619,148

[22] Filed: Mar. 21, 1996

Related U.S. Application Data

[63] Continuation-in-part of Ser. No. 178,704, Jan. 10, 1994, abandoned.

[51] Int. Cl.⁶ .............................. A01G 3/08; B26B 27/00
[52] U.S. Cl. ......................... 30/296.1; 30/231; 248/309.1; 248/674; 16/115
[58] Field of Search ......................... 30/296.1, 231, 30/275.4, 340, 369, 381, 382, 392; 248/309.1, 674, 205.2; 16/114 R, 114 B, 115, 116 R; 56/233, 234, 236, 239, 242, DIG. 18

[56] References Cited

U.S. PATENT DOCUMENTS

| | | | |
|---|---|---|---|
| 3,731,380 | 5/1973 | Mathiesen | 30/381 |
| 3,949,817 | 4/1976 | Rice | 30/296.1 X |
| 4,063,704 | 12/1977 | Rother | 248/316.1 X |
| 4,207,675 | 6/1980 | Causey et al. | 30/296.1 |
| 4,916,818 | 4/1990 | Panek | 30/296.1 X |
| 4,976,031 | 12/1990 | Miller | 30/296.1 |
| 5,070,576 | 12/1991 | Banta | 30/296.1 X |

*Primary Examiner*—Eugenia Jones
*Attorney, Agent, or Firm*—Norman Friedland

[57] ABSTRACT

An open top shoe having a slotted end cap, an opened end, a bottom wall and opposing side walls contoured to removably support a commercially available industrial electric foliage clipper, is integrally supported to an elongated pole that may be telescopic and includes a slotted end cap at one end to encapsulate the aft end of the clipper and a portion of the handle. A strap attached by a cord to the shoe is adapted to secure the trigger to the clipper's handle and place the clipper in the active condition. An electrical extension cord with a male plug is attached internally at the bottom of the pole and a detachable end cap fits into the end of the pole to close the end and the male plug. A female plug adapted to fit into the male plug of the clipper is secured to the end of the electrical extension cord that snakes through a hole formed on the upper end of the pole. Straps supported to the side walls of the shoe secure the clipper in place and prevent the clipper from dislodging from the bottom wall.

9 Claims, 5 Drawing Sheets

EXTENSION AND SUPPORT FOR ELECTRIC CLIPPERS

This application is a continuation-in-part of application Ser. No. 08/178,704, filed Jan. 10, 1994, now abandoned.

TECHNICAL FIELD

This invention relates to an extension to support electric clippers for cutting and trimming hedges, trees and the like and particularly to the shoe for supporting the clipper and an integral elongated pole to allow the operator to reach distances beyond his normal reach.

BACKGROUND ART

As one skilled in the landscaping maintenance art will appreciate, the cutting and trimming of high hedges normally out of the reach of the operator is not only difficult, but is cumbersome as well. Typically, an operator of commercially available clippers of the industrial type, relies on the use of ladders to reach these heights. Obviously the use of clippers, particularly the industrial type, requires a certain degree of care in handling inasmuch as they are a sharp and dangerous instrument and the improper use or an accidental occurrence could cause catastrophic injury.

Additionally, cutting hedges, trees or foliage at high heights is a very tedious and tiring operation. Particularly, when the operator has to reach exceptionally high or has to use a step ladder. Using a step ladder not only requires the constant moving of the ladder, but is particularly strenuous on the legs.

I have found that I can obviate the problems alluded to in the above paragraph by utilizing an extension for supporting the clippers so that the operator can remain on the ground and operate the clippers without ensuing any of the above enumerated encumbrances. To assure the safety of its use, according to this invention, the extension includes a cylindrical pole having formed integrally therewith an open ended and opened top shoe that is contoured to provide an aft enclosed end, a fore opened end to accommodate the cutting tool of the clipper, a bottom wall and opposed side walls to accommodate the shape of the handle of the clipper. The top is opened to removably receive the clipper and judiciously located flexible straps attached to the side walls of the shoe together with the shoe encapsulates the handle of the clipper and secure it in place removing any slack for avoiding relative movement of the clipper. A VELCRO strap that fastens onto the handle of the clipper to depress the on/off switch to keep it in the on position while a second manually operated electric on/off switch mounted in series electrical relationship located in proximity to the handle of the extension allows the operator to activate and deactivate the clipper. The strap is secured to the extension tube by a cable pinned to the tube.

A male electrical plug is fixed to the end of the extension tube to accept the female plug connected to an extension cord that plugs into a ordinary house electrical outlet or other electrical power source. The male receptacle is electrically coupled to the clipper by a complementary female receptacle adapted to accept the male receptacle that ordinarily is included as a component of the clipper. An end cap fits on the end of the extension tube to cover the male receptacle when not in use so as to protect it from debris and the environment.

SUMMARY OF THE INVENTION

An object of this invention is to provide an extension rod for a commercially available industrial type of clipper to enable the operator to reach heights beyond his normal reach without having to resort to ladders.

A feature of this invention is to provide for an extension as described a shoe adapted to removably accept the handle of the clipper and support the same while assuring the safety of the use of the extension. The extension/shoe combination is characterized as being light in weight, easy to use, and relatively inexpensive.

Another feature of this invention is the use of a VELCRO strap attached to the SHOE via a cable that is fastened to the handle and the clipper switch on the handle of the clippers so as to depress the on/off switch of the clipper in the on position and serves the dual function of adding a safety feature to secure the clippers in the event of an inadvertent dislodging of the clippers occasioned by the straps not being fully secured or some other unforeseen adverse condition.

Another feature of this invention is the means for locking the extension poles in place in the deployed and retracted positions to assure that the clippers don't rotate relative to the pole and its handle.

The foregoing and other features of the present invention will become more apparent from the following description and accompanying drawings.

Figure 1:
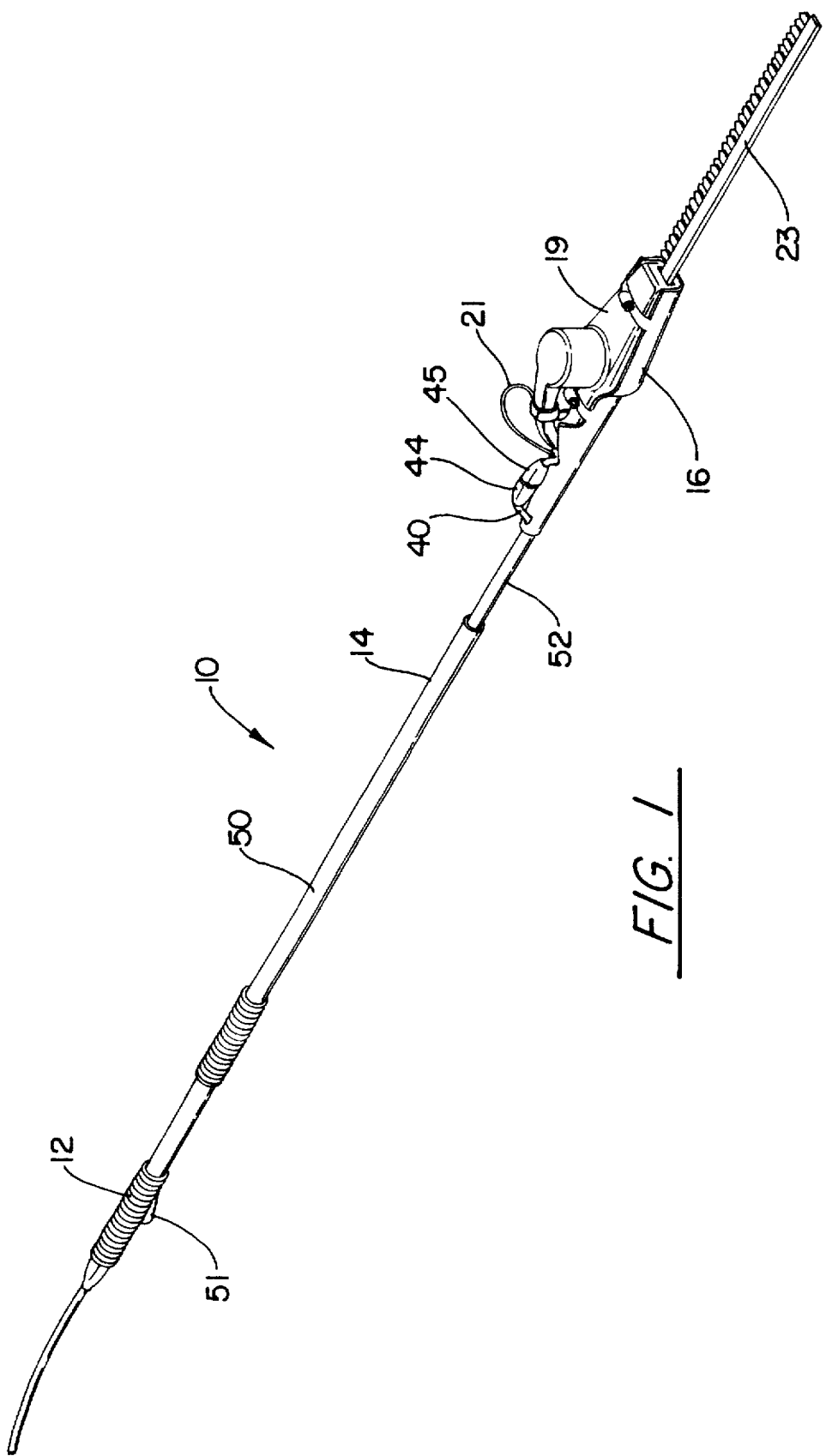
FIG. 1 is a perspective view in elevation of the extension/shoe supporting a commercially available clipper.

Best Mode for Carrying Out the Invention

While this description discloses the preferred embodiment of this invention, as one skilled in this art will appreciate the particular contour of the shoe is specifically designed to accommodate one type of commercially available industrial clipper. This is not intended as a limitation to the scope of this invention, as the contour will be predicated on the particular clippers being supported.

Referring next to FIGS. 1-5 which illustrates the details of this invention as comprising an extension generally illustrated by reference numeral 10 including a handle 12 fixed to the bottom end of telescoping elongated pole 14 and shoe 16 fixed to the top end of telescoping pole 14. The shoe and telescoping pole are preferably fabricated from a fiberglass fabric and/or carbon fiber tape and an epoxy resin and/or polyester resin. The fabric and/or tape are cut to the appropriate size(s) and are plied and configured to the desired shape. The number of plies and orientation of the tapes and/or fabric will depend on the weight and size of the clippers. The resin, after applied to the fabric and/or tapes is then heated and cured until the desired hardness is attained. These materials are commercially available, but it should be appreciated by one skilled in this art that other materials that exhibits sturdiness, durability and reliability can be equally utilized.

The commercially available industrial clipper 19 is supported in the shoe 16 as shown and the straps 18 and 20 suitably bonded to the bottom wall 24 of shoe 16 prevent the clipper 19 from falling out and sliding forward. Also the straps 18 and 20 are sufficiently tightened to remove any slack and prevent the handle 21 of the clipper from moving in any direction. An end cap 26 formed on the aft end of shoe 16 includes an elongated slot 28 at its forward end to removably accept the handle 21 of the clipper 19 and encapsulates the aft end of the handle 21 of the clipper 19. The slot 28 assures that the clipper does not rotate about its center line when attached to the shoe 16. As noted in these Figs. the blade 23 of the clipper 19 extends through the open end 32 at the fore end of shoe 16.

VELCRO strap 34 is attached to the aft end of shoe 16 by cable 35 secured to the shoe by a suitable pin or rivet 36. The VELCRO strap 34 is fastened over the handle 21 of the clipper 19 and engages and depresses its on/off switch (not shown) to place the clippers in the activated condition. The VELCRO strap spring clip 34 and its cable 35 serve a dual function of depressing the clipper's switch and holding the clipper in the event of a strap failure or other occurrence that would otherwise allow the clipper to inadvertently fall out of the shoe.

Pole 14 is hollow and its inner diameter is sufficiently large to accept a suitable electric cord 40 with a male receptacle 42 mounted on the bottom end of the pole. The plug 42 is secured in place by any suitable attaching means. A female receptacle 44 adapted to receive the male receptacle 45 of the clipper is plied to the wires at the end of the cord 40 which is snaked through an aperture formed on the upper end of pole 14. This plug 42 serves to accept the male receptacle of the clipper 19 to electrically connect the clipper's motor (not shown) to an readily available outlet serviced by the electric utility company or an electrical generator (not shown), as the case may be. Removable cap 41 frictionally fitted to the bottom end of the pole 14 closes off the end and protects plug 42 when not in use. A suitable cord 43 attached to pole 14 keeps cap 41 secured to pole 14 for the convenience of the operator.

Figure 4:
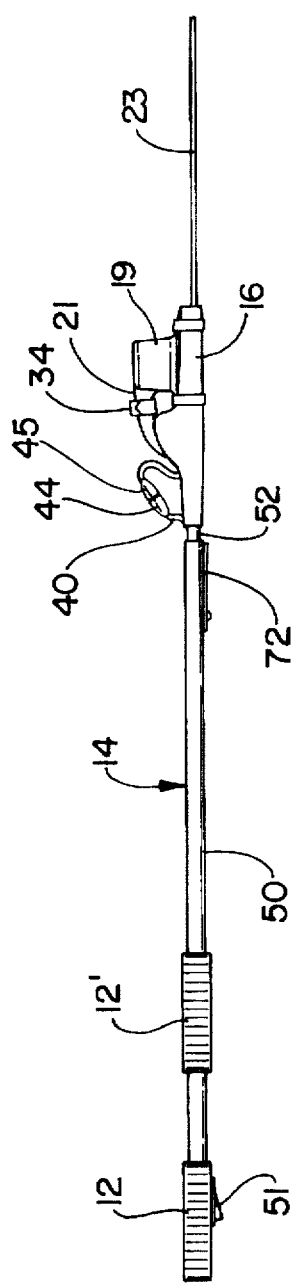
FIG. 4 is a plan view of the assembled extension and clipper when the telescoping pole is in the retracted position.
Figure 5:
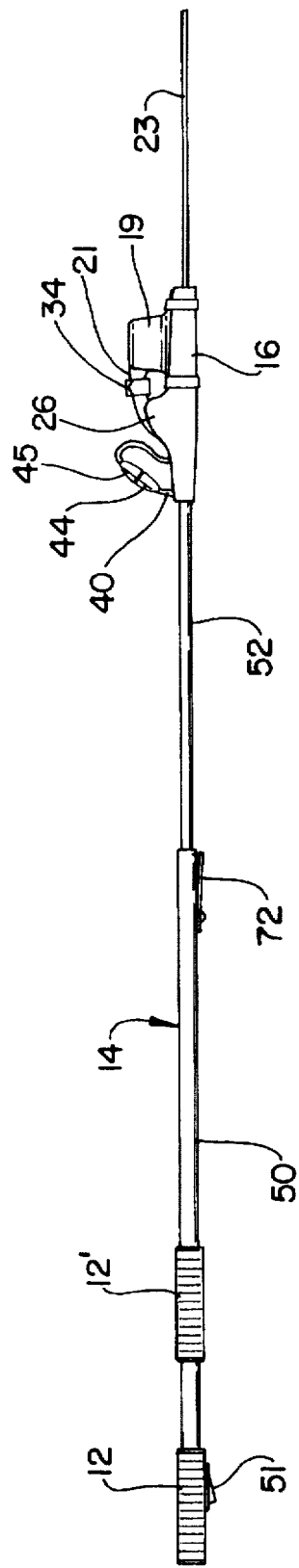
FIG. 5 is a plan view identical to the embodiment depicted in FIG. 4 excepting the extension pole is in the deployed position.

As noted in FIGS. 4 and 5, the extension pole 14 is telescopic and includes an outer pole 50 and inner pole 52 of a lesser outer diameter than the inner diameter of pole 50. Means such as retractable spring latch 72 (as will be more fully explained hereinbelow) is attached to pole 50 by any suitable means locks the two poles into place and prevents them from either retracting or rotating. Obviously, any other locking means can be utilized but it is of significance that in this environment it is abundantly important that the poles do not rotate relative to each other and can not separate or detach themselves when the clipper is mounted for operation.

Handle 12 may be any form of hand grip fabricated from a rubber or plastic material that circumscribes a portion of the lower end of the pole 14 and is comfortable to the grip of the operator. A second similar hand grip 12' axially spaced therefrom circumscribes a portion of pole 14 and is used so as to be gripped by the second hand of the operator so that he can use both hands and arms to operate the clipper.

A commercially available on/off switch 51 is mounted on the lower end of pole 14 which is easily accessible to the operator for opening and closing the electric circuit to the motor of the clipper 19 through the already depressed switch mounted on the handle of the clipper.

Figure 2:
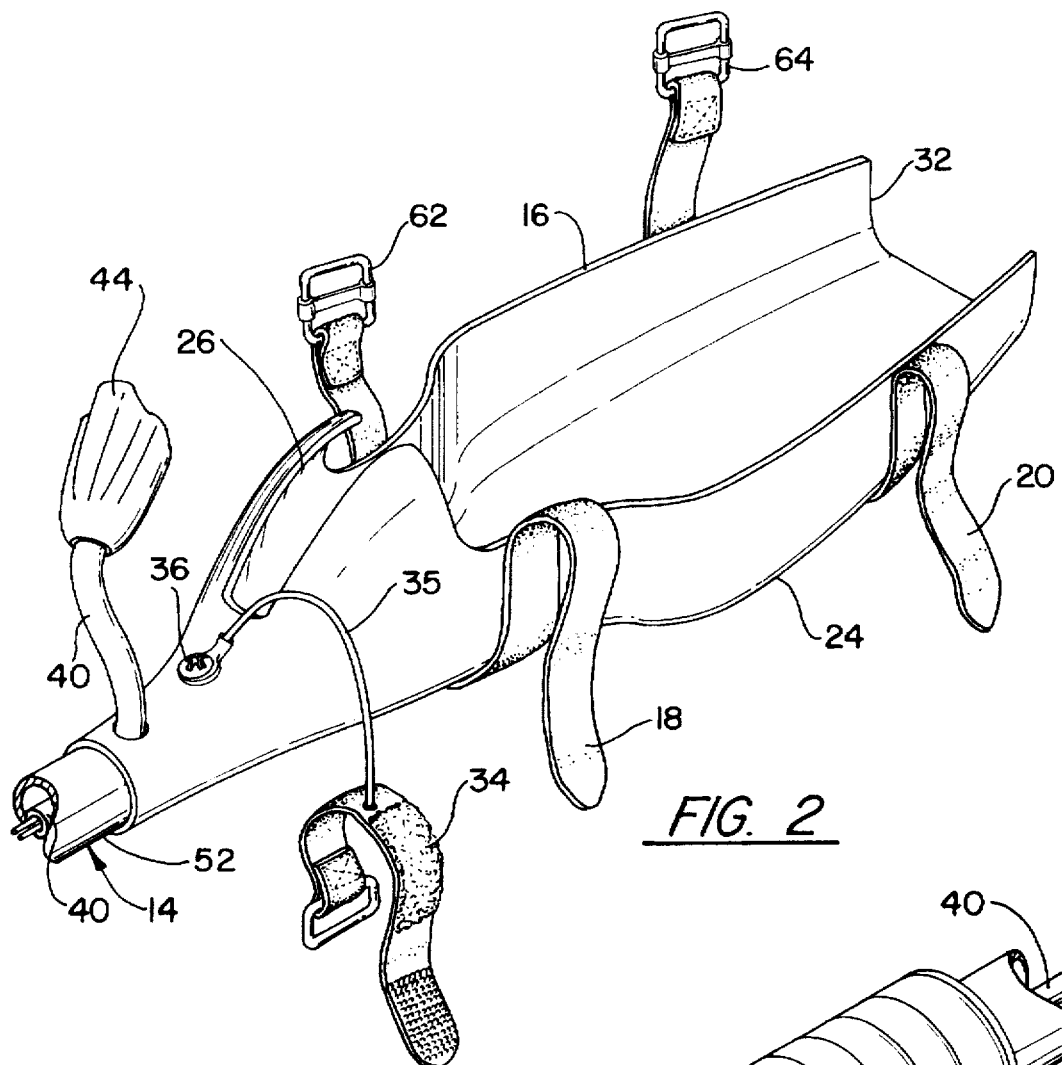
FIG. 2 is a perspective view in elevation illustrating the details of the shoe of this invention.
Figure 3:
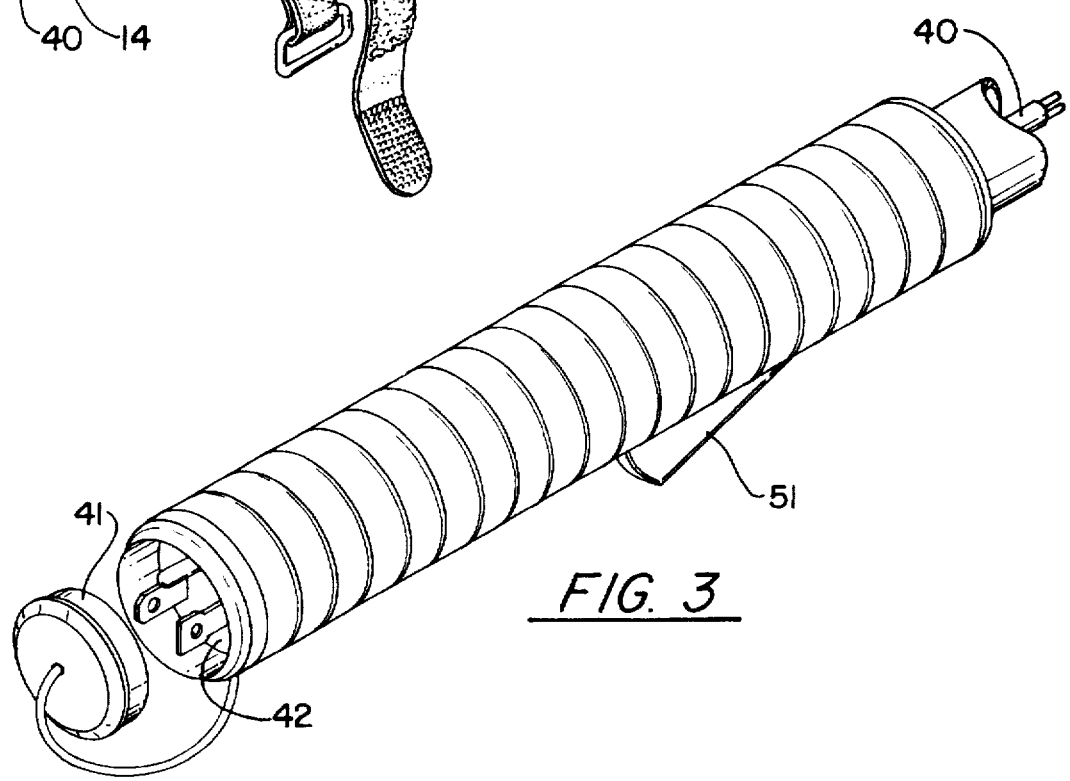
FIG. 3 is a partial perspective view of the end of the extension rod illustrating the switch and male electrical plug internally attached thereto.

The straps 18 and 20 depicted in the embodiment of FIG. 2 are of the buckle variety in that the end of straps 18 and 20 fit into and loop around the buckles 62 and 64 to obtain the tight fit required. Alternatively, this invention contemplates the use of VELCRO straps consisting of a female and male VELCRO complementary strips. The female is a loop material and the male is a hook material, both of which are commercially available. One strap may be attached to one side of the shoe and the other being attached to the other side of the shoe such that the VELCRO strips overlie each other to attach to each other and hold the clipper in place. It is completely arbitrary as to which strap is located at the sides of the shoe and which strip overlies the other so long as the grip is sufficient to hold and support the clipper to the shoe 16.

Figure 6:
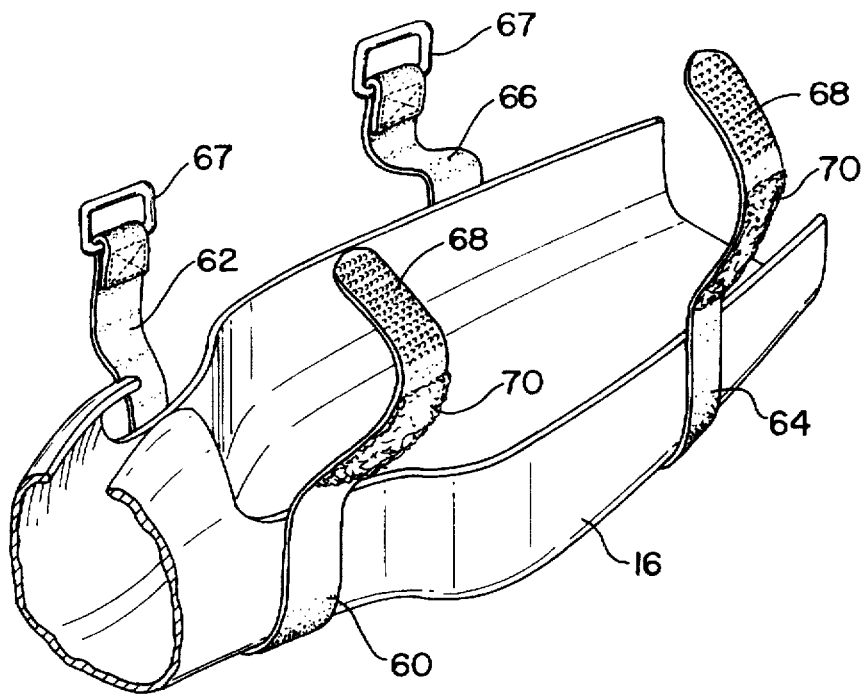
FIG. 6 is a partial perspective view in elevation of the shoe portion of the extension pole illustrating the VELCRO straps.

FIG. 6 exemplifies the preferred embodiment of the use of the VELCRO strips. As noted the shoe 16 includes straps 60 and 62 at the fore end and straps 64 and 66 at the aft end being attached to shoe 16 by any suitable means. A single strap may be employed at either end rather than each being made in two pieces. As noted buckle 67 is suitably attached at one end of strap 62 and strap 67 by lopping the end of the strap and sewing it in place in a well known manner. Strips of VELCRO straps are attached to the other end facing outwardly. Strip 68 may be the male type and strip 70 may be the female type. It is apparent from the foregoing that the strap is inserted and looped over the buckle 67 and folded over so that the strip 68 and strip 70 interlock.

Figure 7:
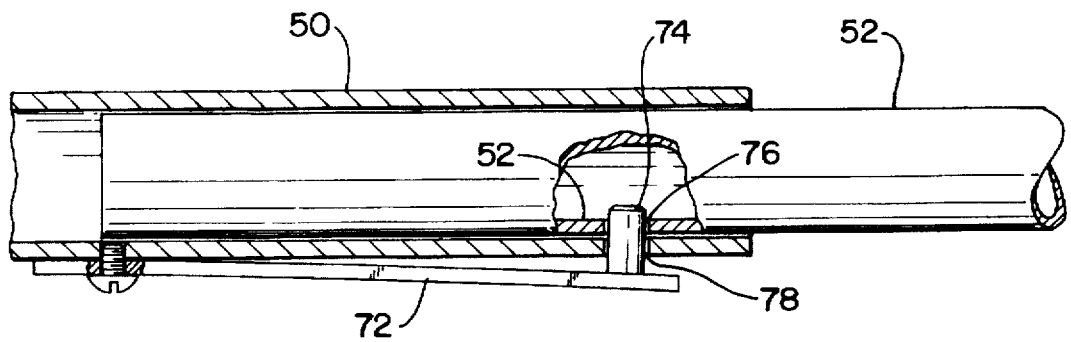
FIG. 7 is a partial view in section illustrating the details of the latch mechanism for securing the telescopic extension pole.

An option for locking the telescopic poles 50 and 52 depicted in FIGS. 4 and 5 is illustrated in the sectional view of FIG. 7. As noted a spring latch 72 consisting of an elongated narrow element formed from a metallic spring material that is flexible and resilient is attached to the pole 50 at one end by a suitable machine screw or the like and includes a inward facing projection 74 adapted to fit into complementary holes 76 and 78 formed in the cylindrical walls of poles 50 and 52, respectively. Hence when the poles are deployed the spring loaded latch will force projection 74 to enter internally of the poles through the aligned holes 76 and 78.

Figure 8:
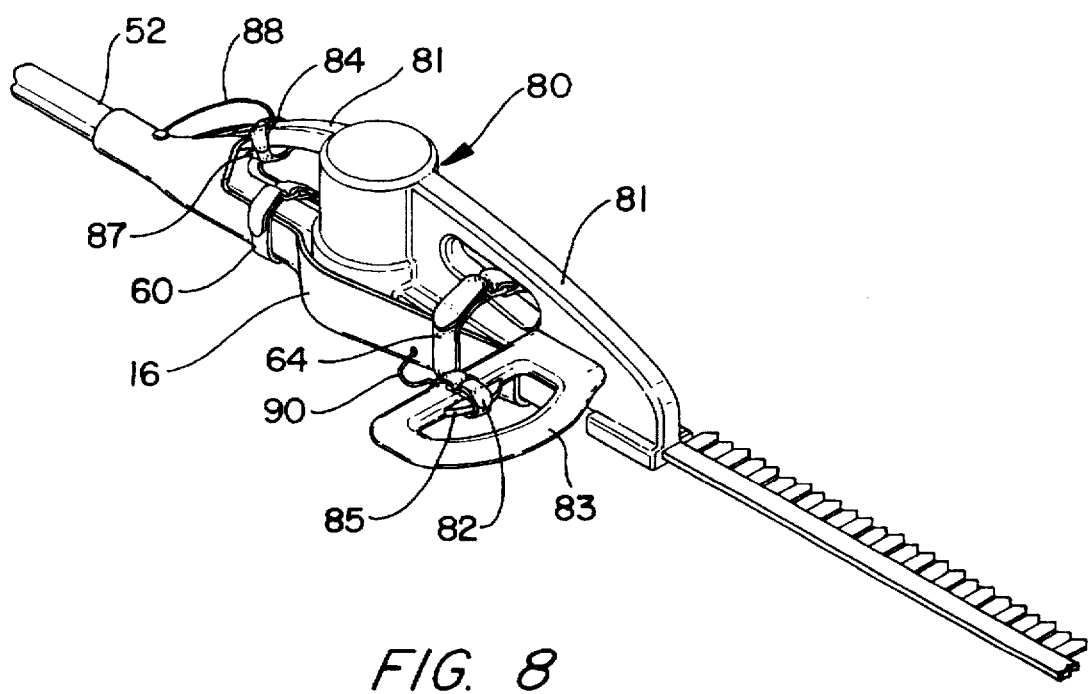
FIG. 8 is a perspective view illustrating another embodiment of this invention adapted to support a commercially available dual handle/switch electric clipper.

FIG. 8 exemplifies another embodiment of this invention which is adapted to accommodate dual handles 81 and 83 and switch electric clipper generally indicated by reference numeral 80. (The same reference numerals are used throughout the drawings to depict similar elements). The shoe 16 supports the clipper 80 similar to the one depicted in FIGS. 1–4. However in this arrangement additional straps 82 and 84 fabricated similar to straps 60 and 62 but formed from a single piece and includes the VELCRO strips for interlocking the straps when they are looped in place. Each strap is held to the shoe 16 by suitable cables 88 and 90 suitably attached to the shoe 16 at the respective ends of the cables. Straps 82 and 84 serve to depress the operating switches 85 and 87 respectively of the electric clipper 80 to place them in the activated position so that the actuation of the clippers is controlled by the switch 51 located at the handle of the extension pole.

Although this invention has been shown and described with respect to detailed embodiments thereof, it will be appreciated and understood by those skilled in the art that various changes in form and detail thereof may be made without departing from the spirit and scope of the claimed invention.

I claim:

1. In combination, an electric clipper having a handle with opposing sides, a cutting end and an on/off switch, extension means attached to said electric clipper so as to be operated by a person for cutting or trimming foliage out of the reach of the person, said extension means including an elongated pole and a shoe, said elongated pole having a proximal end and a distal end, said shoe having a fore end, an aft end, a bottom wall, a top and opposing sides, said shoe being attached to the distal end of said elongated pole, said shoe being open at said top and said fore end, said opposing sides of said shoe being contoured to hug the opposing sides of said handle of said electric clipper and said bottom wall adapted to removably support said electric clipper with said cutting end of said electric clipper extending through said fore end of said shoe, said top including an enclosure portion disposed at the aft end of said shoe extending from said bottom wall to encapsulate a rear portion of said handle of the electric clipper including a portion of said handle thereof extending into an axial slot formed in said enclosure portion, first strap means attached to said shoe fastening said electric clipper to said shoe to prevent said clipper from falling out of said shoe, an electric connecting means for connecting said electric clipper to an electrical power source, second strap means, a cable having one end attached to said shoe and the opposite end attached to said second strap means, said second means being wrapped around said handle of said electric clipper to engage the switch on said handle to hold the on/off switch in the on position.

2. The combination as claimed in claim 1 wherein said pole is telescopic, said telescopic pole comprising an inner elongated member and an outer elongated member being in sliding relationship relative to each other for movement between a retracted and extended position, and latch means attached to said pole for locking said inner and outer elongated members of said telescopic pole in position with respect to each other when said telescopic pole is deployed in the extended position.

3. The combination as claimed in claim 2 wherein said electric connecting means includes a first male plug attached to one end of said outer elongated member of said telescopic pole.

4. The combination as claimed in claim 3 wherein said electrical connecting means includes an electrical extension cord attached to said male plug and extending through an aperture formed at the distal end of said elongated pole and said electrical extension cord having a female plug adapted to fit another male plug attached to said electric clipper.

5. The combination as claimed in claim 4 including an end cap removably secured to the one end of said outer elongated member of said elongated pole and being disposed adjacent to said first male plug.

6. The combination as claimed in claim 5 wherein said first strap means includes hook and loop fastening means including a first strip member and a second strip member in opposing relationship, said first and second strip members attached to one of said opposing side walls of said shoe wherein said first strip member and said second strip member overlie each other to fasten said electric clipper to said shoe to prevent said electric clipper from falling out of said shoe.

7. The combination as claimed in claim 6 wherein said hook and loop fastening means includes a third strip member and a fourth strip member, said third and fourth strip members being spaced from to said first and second strip members along the length of the shoe, said third and fourth strip members overlying each other to fasten said electric clipper to said shoe to help prevent said electric clipper from falling out of said shoe.

8. In combination, an electric clipper having a handle and opposing sides, a cutting end and an on/off switch, shoe means attached to said electric clipper so as to hold said electric clipper, a pole attached to said shoe means so that said electric clipper can be operated by a person for cutting or trimming foliage out of the reach of the person, said shoe means having a fore end, an aft end, a bottom wall, a top and opposing sides, said shoe means being open at said top and said fore end of said shoe means, said opposing sides of said shoe means being contoured to hug the opposing sides of said handle of said electric clipper and said bottom wall adapted to bear against said electric clipper, said cutting end of said electric clipper extending through said fore end, said top including an enclosure portion disposed at the aft end of said shoe means extending from said bottom wall to encapsulate a rear portion of said handle of the electric clipper including a portion of, said handle thereof extending into an axial slot formed in said enclosure portion, strap means attached to said shoe means for fastening said electric clipper to said shoe means to prevent said electric clipper from falling out of said shoe means, an electric connecting means for connecting said electric clipper to an electrical power source, a cable having two ends, one end being attached to said shoe means and the opposite end being attached to said strap means, said strap means engaging said on/off switch to hold said on/off switch in the on position.

9. The combination as claimed in claim 8 wherein said electric clipper includes a second on/off switch on said electric clipper, a second strap means being wrapped around said second switch to hold said second on/off switch in the on position, a second cable having one end attached to said shoe means and the other opposite end attached to said second strap means for holding said second strap means to said shoe means when the clipper is removed from said shoe means.

* * * * *